United States Patent [19]

Casden

[11] Patent Number: 4,585,930
[45] Date of Patent: Apr. 29, 1986

[54] SLOTLESS MAGNETIC CARD READER

[75] Inventor: Martin Casden, Calabasas, Calif.

[73] Assignee: Soundcraft, Inc., Northridge, Calif.

[21] Appl. No.: 567,431

[22] Filed: Dec. 30, 1983

[51] Int. Cl.$^4$ ............................................. G06K 7/08
[52] U.S. Cl. .................................. 235/449; 235/382; 235/486
[58] Field of Search ............... 235/440, 449, 485, 486, 235/482, 483, 449, 382

[56] References Cited

U.S. PATENT DOCUMENTS

| | | | |
|---|---|---|---|
| 3,596,061 | 7/1971 | Gechele et al. | 235/486 |
| 3,896,292 | 7/1975 | May et al. | 235/486 X |
| 4,112,292 | 9/1978 | Varvel et al. | 235/449 |

Primary Examiner—David L. Trafton
Attorney, Agent, or Firm—Beehler, Pavitt, Siegemund, Jagger & Martella

[57] ABSTRACT

A slotless card reader for reading magnetically encoded cards is disclosed having an array of magnetic sensors defining a card plane, a magnetically permeable covering over said array and defining a card touch surface exposed for manually applying a magnetic card downwardly against the touch surface, or for lifting a card from the touch surface, and positioning aids for accurately aligning a magnetic card held against the card touch surface in relation to the array of magnetic sensors. The reader may further include a number of position sensors which are simultaneously actuated upon correct positioning of a magnetic card for reading, as a condition for activating the reader device and prevent premature, erroneous readings.

24 Claims, 3 Drawing Figures

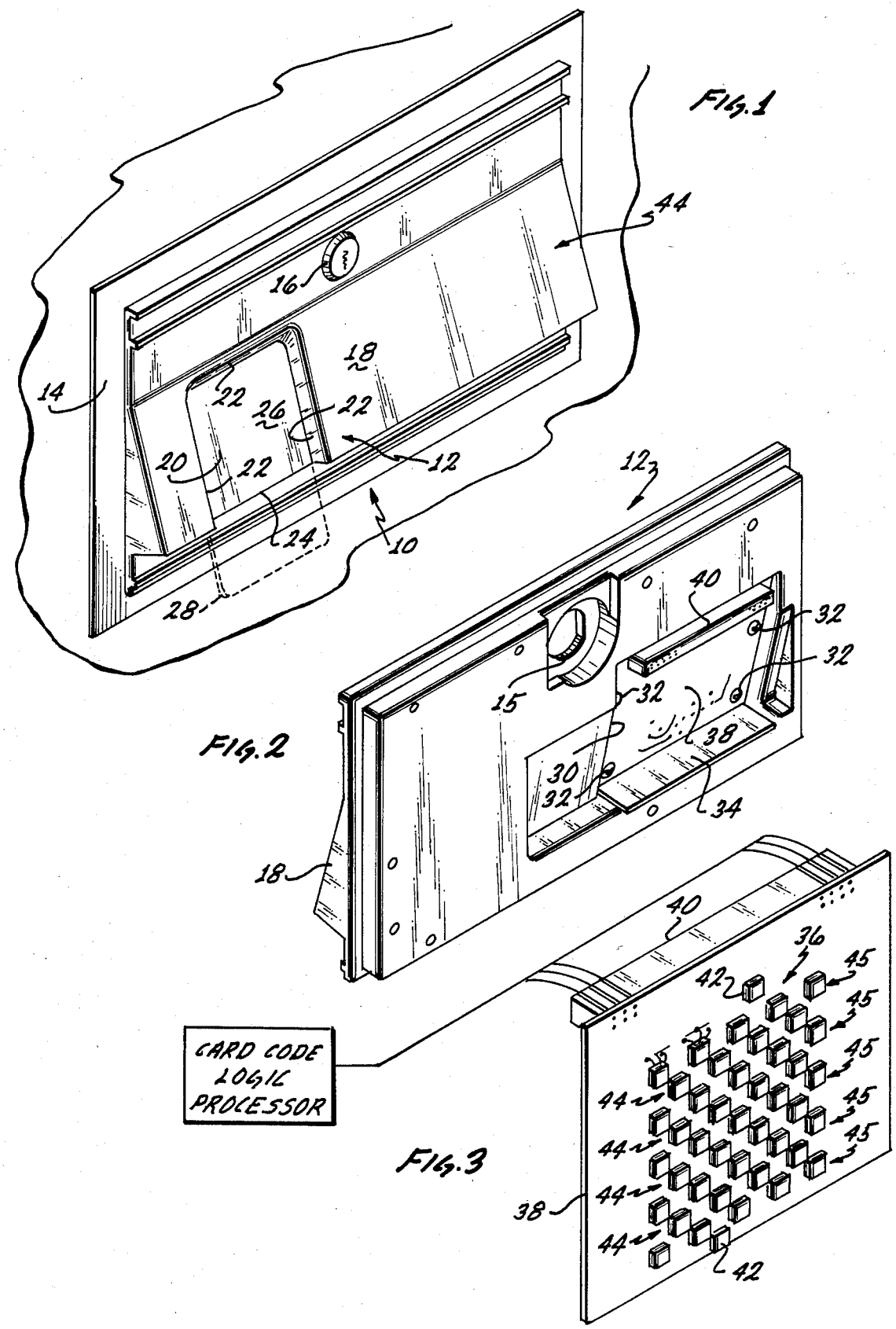

SLOTLESS MAGNETIC CARD READER

BACKGROUND OF THE INVENTION

1. Field of the Invention

The present invention relates generally to magnetic card readers and more particularly pertains to a slotless card reader wherein a magnetically encoded card is read through a magnetically permeable wall in a reader device.

2. State of the Prior Art

Magnetically encoded cards have come into widespread use in recent years for a variety of applications. One important use for such cards is in access control systems, such as are used to control parking lot gates, and generally to restrict operation of electrically actuated locks, doors and other devices.

Access control cards, also known as cardkeys, are laminar structures in which is incorporated magnetizable material such as barium ferrite, usually in sheet form on which magnetic patterns can be defined so as to encode information readable by a suitably constructed reader device. The manner of encoding and reading of such cards is well known.

Existing reader devices are housed in an enclosure which is provided with a slot for admitting the cards to be read.

Known card reader devices may be classified into two broad catagories, namely, static readers and dynamic readers. In a dynamic reader, the encoded card must be moved relative to the reader in order for the reading to take place. This is the case, e.g., in cards having an encoded magnetic stripe where the stripe must be moved past a read head which operates in a manner analogous to a playback head in an audio tape player.

A static reader by contrast reads the magnetically encoded card while the card is stationary relative to the reader. Typical of these are the tumbler operated readers commonly used in parking lot access gates in which mechanical tumblers are moved by magnetized areas or elements in the cards. The magnetic areas must be positioned so as to actuate the correct tumbler combination in the reader. In this type of reader, gravity is needed to return the tumblers to their normal position after the card is withdrawn. As a result, tumbler type readers have to be mounted vertically for proper operation. In addition to the tumbler mechanism for "reading" the information encoded on the card, this type of card reader is provided with a limit switch which is actuated by fully inserting a card into the slot. The switch completes the power circuit to the electrically operated access gate or lock if the proper combination of tumblers has been actuated. The slot in the reader housing thus serves to correctly position the card relative to the reader mechanism and to direct the card into contact with the limit switch by inserting the card into the reader through the slot.

In dynamic readers, the card slot serves a somewhat different purpose. A card transport mechanism is normally provided in the reader device which carries the card past a read head at a constant predetermined speed so as to avoid erroneous readings due to variations in card movement past the read-head. Constant speed would be difficult to achieve if the individual were allowed to manually move the card past the read-head. A further purpose served by the card slot is that by inserting the card into the reader, the individual forfeits control over the card. Thus, if the reader system determines that the card is being misused, the reader device may withhold the card and keep it out of reach of the person inserting it into the reader due to the restricted slot opening and where the reader device is built around electronic sensors which, unlike prior art mechanical tumbler readers, may be mounted at any desired angle away from the vertical without imparing the operation of the system.

Card slots in reader devices have been the target of malicious mischief and petty vandalism of the type where foreign matter, e.g., crumpled paper, chewing gum, and liquid beverages are introduced into the reader device through the card slot, jamming the reader and possibly damaging the mechanical or electronic components of the system. It is therefore desirable to provide a slotless card reader lacking any opening in the reader housing so as to avoid such vandalism, thereby increasing the reliability of the system and minimizing maintenance costs.

A slotless card reader is feasible in systems where some spacing is permissible between the card and the reader device to allow for a magnetically permeable wall member to be interposed therebetween. This is not usually the case with magnetic read heads used for reading data encoded on magnetic stripe in dynamic readers. These systems require close proximity between the strip and the read head in order to obtain adequate sensitivity and resolution of the encoded data. Such difficulties do not exist in access control cards where data is encoded in low density formats as in parking lot and similar relatively low security applications and particularly in readers using Hall effect devices. While Hall effect magnetic sensors and magnetic card readers using the same have been known and used commercially for some time in access control applications, heretofore no advantage has been taken of the characteristics of such readers which make practical the construction of slotless card readers.

SUMMARY OF THE INVENTION

The present invention is therefore a slotless card reader for reading magnetically encoded cards. The reader comprises a front panel having a public side and an inner side. At least a portion of the front panel is made of a magnetically permeable material such as stainless steel which defines a card touch area. An array of magnetic sensors is positioned against the card touch area on the inner side of the panel. Card positioning means are provided on the public side of the card touch area for aligning an access card placed thereon with the magnetic sensor array on the opposite side of the panel. A reader device connected to the outputs of the sensor arrays thus reads magnetic spots encoded on the card through the magnetically permeable material without any need for openings in the front panel. Correct alignment of the card with the reader device which is essential for the correct decoding of the card data is assured by means such as, for example, a rectangular depression or pocket defined in the front panel and dimensioned to snugly receive an access card of standarized dimensions so as to accurately align the card relative to the magnetic sensor array on the opposite side of the magnetically permeable portion of the front panel.

Preferably, the electronic reader system reads the magnetic pass cards in a three tier sequence. A first group of magnetic sensors in the reader array is responsive to a first group of magnetic spots encoded at particular locations on the card so located that recognition of this first group of spots ensures that the pass card is correctly positioned relative to the sensor array and is also flat against the card touch surface. Recognition of the flat positioning of the card is essential for correct reading of encoded card information. In existing readers equipped with a card slot, the attitude of the card, i.e., its "flatness" relative to the reader's sensors is assured by the restrictive slot opening. This is not the case in a slotless reader with an open card touch surface and therefore additional means are needed to ensure correct positioning of the card before a reading can be attempted.

Once the first group of sensors recognizes a properly positioned passcard, a second group of magnetic sensors in the sensor array tests for encoded information which is recognizable by the reader device as an authorized access code. In a preferred embodiment, the second group of sensors is dedicated for testing first for a facility or system code which identifies the particular passcard as belonging to the system of which the reader is a part. Once the card is so recognized, a third group of sensors in the sensor array then interrogates the passcard for identity information to check for user identification currently authorized to access the particular facility. In this manner, the authorized access of a particular identification number to different facilities may be changed by reprogramming the card reader system without need to change the user's passcard or identification number.

These and other advantages of the invention will be better appreciated by reference to the following figures taken together with the detailed description of the preferred embodiment.

BRIEF DESCRIPTION OF THE DRAWINGS

FIG. 1 is a front perspective view of a typical magnetic card reader terminal constructed according to the present invention.

FIG. 2 is a rear perspective view of the front plate of a magnetic card reader terminal according to the present invention.

FIG. 3 illustrates a magnetic sensor array for use in the card readers of FIGS. 1 or 2.

DETAILED DESCRIPTION OF THE PREFERRED EMBODIMENTS

With reference to the drawings and FIG. 1 in particular, a typical slotless magnetic card reader 10 according to this invention includes a front panel 12 which is mounted into an opening defined by a frame 14 in a wall or other suitable structure. A key operated switch 16 may be provided for activating and/or bypassing the system. The front panel unit 12 includes a projecting portion 18 which defines a surface sloping downwardly and outwardly from the plane of the mounting frame 14. A recessed card touch area 26 is defined in the sloping surface 18 as a rectangular depression bounded along three sides by raised edges 22. The lower side 24 of the card touch area is unbounded so that the lower end of a magnetic card 28 placed against the card touch area is shown in phantom lining in FIG. 1 extends downwardly and away from the panel and may be conveniently held while the magnetically encoded upper portion of the card is positioned in the card pocket 26 for reading.

FIG. 2 illustrates the reverse or rear side of the panel unit 12 in which is defined an opening 30 corresponding to the backside of the card pocket 26. A magnetically permeable relatively thin stainless steel plate 20 is fixed in place by means of screws 32 so as to close the opening 30 and form the floor of the card pocket. The steel plate may include a lower flange 34 which extends rearwardly to close the underside of the sloping panel portion 18 in the particular panel structure illustrated. It is understood that materials other than stainless steel may be used to make the card touch plate 20, e.g. plastics, glass, etc., so long as the material is not magnetically shielding.

A planar magnetic sensor array 36 shown in FIG. 3 is mounted on a printed circuit board 38 which interconnects the individual sensors of the array 36 to a multiconductor female connector 40. The sensor array 36 in the presently preferred embodiment consists of solid state Hall effect magnetic sensors. The sensor array 36 is mounted so that the Hall effect sensors lie against the rear side of the steel plate 20. The Hall effect sensors readily detect magnetic spots on a properly encoded magnetic card placed against the front or outer side of the steel plate 20. Each sensor in the array 36 represents a potential magnetic spot in a magnetizable cardkey constructed in a manner known to the art. Information is encoded on the cardkey by magnetizing selected ones of these spots. When the card is applied to the reader binary information is derived by the magnetic sensors, which is then processed by suitable logic circuits. Typically, Hall effect sensors of 100 Gauss sensitivity may be used to detect magnetic spots encoded on conventional cards according to practices and methods known to the industry. Each Hall effect sensor corresponds to the position of a potential magnetic spot in a magnetic card, and the magnetic card is aligned with the sensor array by the edges 22 of the recess 26.

The panel unit 12 shown in FIG. 2 is similar in all respects to the panel unit of FIG. 1 with the exception that the key lock 16 of FIG. 1 has been removed from its mounting hole 15.

Preferably, the sensor array 36 is arranged to include three banks or groups of sensors which together with suitable logic circuits operate in a three tiered read sequence. Since each Hall effect device consumes power in operation, it is desirable to minimize the number of such sensors which are in active standby condition. This problem is overcome in the present system by providing a small number, e.g. two, position X sensors 42 which are continuously active when the system is operational and in stand-by condition, while the remaining sensors in the array 36 are turned off to conserve power. Specifically, a first bank of magnetic sensors includes the pair of sensors 42 which are sufficiently spaced apart on the circuit board 38 to ensure that a positive reading by both sensors is indicative of the presence of a magnetically encoded card key 28 properly positioned in the recess 26 and lying flat against the touch card surface defined by the steel plate 20. The sensitivity of the magnetic sensors 42 is such that if the card deviates from flat against the steel plate 20, one or both of the sensors will not be actuated by the magnetic spot on the card corresponding to the sensor's position and a positive indication of a card ready for reading will not be obtained by the system.

The first tier of sensors, such as sensors 42, performs the function which is normally carried out by mechanical limit switches or magnetically sensitive reed switches in conventional slotted card readers to ascertain whether a card has been fully inserted into the slot and is thus properly positioned for reading. It will be appreciated that in a slotted card reader the slot opening itself correctly positions the card relative to the magnetic reader, i.e. the slot cavity limits the freedom of movement of the card to a single axis, i.e. the in-and-out direction of movement. Thus, only a limit switch or sensor is required to test for full insertion of the card into the slot, at which point the card will be correctly positioned in three dimensional space. The positioning problem is more complex in a slotless card reader, such as disclosed herein, where the structure of the card reader does not guide and position the magnetic card to the same degree as the slot in prior art devices. Thus, the card 28 must be located on the touch card area defined by the steel plate 20, between the vertical edges 22 and such that the upper end of the card abuts the upper edge 22 of the recessed card touch area, and the card must lie substantially flat against the steel plate 20 while at the same time touching all three edges 22 bounding the card touch area. Even if the card correctly overlies the touch area 26 but does not lie flat against the steel plate, it is possible that part of the magnetically encoded spots on the card will be out of range of the corresponding magnetic sensors underlying the steel plate 20. In such a situation an erroneous reading of the card would result since only part of the encoded information would be correctly read. This difficulty is overcome by providing the position sensors 42 which may be so located that all other magnetic sensors are located therebetween. The positioning of the sensors 42 illustrated in FIG. 3 will suffice in most situations to assure flatness of the card against the card touch area. However, more than two position sensors may be used and a different arrangement in positioning of the sensors may be chosen.

An optional sound bank of sensors, includes horizontal rows 44 in FIG. 3, including a total of 16 sensors arranged in a 4×4 matrix, it being understood that the number and arrangement are only exemplary. This second tier may test for the presence of a correct system or facility code on the magnetic card being read, once an indication of correct card positioning has been obtained by means of position sensors 42. A correct position reading of sensors 42 causes electrical power to be applied to the remaining magnetic sensors on the circuit board 38, so that reading at the second and third tiers may proceed. The appropriate logic circuits may then interrogate the second bank of sensors (if one is provided) to determine whether the correct system or facility code is present on the particular card key being read.

The third tier reading employs horizontal sensor rows 45 in which 25 magnetic sensors are arranged in a 5×5 rectangular matrix intermeshed with the second tier matrix defined by rows 44. If a correct facility code has been recognized by the system, the reading then proceeds to interrogation of the third bank of sensors comprised of sensor rows 45. At the third tier, the individual identify information encoded on the card may be read and compared to a stored list of authorized I.D. numbers. If the encoded information is recognized as a number authorized for access to the particular facility, then the system actuates the access means i.e. door, gate or other device controlled by the card reader system.

In a presently preferred arrangement, the sensor array 36 on the circuit board 38 is connected to first logic circuits which may be disposed at the location of the card reader panel 12. The local logic circuits may be relatively simple, hard wired logic circuits programable by means of switches for carrying out the reading and logic functions associated with the first and second sensor banks, namely the first tier card position testing associated with position sensors 42 and the second tier facility code testing associated with sensor rows 44. For example, the position logic circuit may include an AND gate connected to the outputs of the two position sensors 42. The output of the AND gate may in turn control circuits which apply power to the sensor rows 44 and 45. Since only one facility code will normally be required at a particular reader location, this information is also readily programmable in the reader's logic circuits by means of switches which once set need not be disturbed or reset for long periods of time, if ever. The personal identity code testing, however, may require comparison of encoded card information with numerous authorized code numbers. This function may be most effectively carried out by a data processor located remotely of the reader location. The reader system may thus include data communication circuits which are actuated following successful conclusion of reading at the first and second tiers. The personal identity information read by the system is transmitted through communication circuits to the remote processor where it is checked against stored information. If the remote processor identifies the card as belonging to an authorized individual, a go-ahead code is returned to the local reader system which then may actuate the access means. The logic, data processing and communication circuits required to perform the above functions are well known in the art and need not be described here.

The present invention is not limited to Hall effect magnetic sensing devices, but may include any other suitable sensor devices, including e.g. magnetic reed switches, which can be arranged and disposed in a suitable planar array so as to define a touch card plane overlying the sensor array. Further, it is not strictly necessary to provide a panel structure with a separate magnetically transparent plate 20 such as illustrated in FIGS. 1 and 2.

For example, the magnetic sensor circuit board 38 of FIG. 3 could be encapsulated in a suitable magnetically permeable material such as epoxy resin or the like, so as to define a card touch surface closely overlying the plane of the sensor array 36. The encapsulating material may be shaped or molded so as to define suitable card positioning means about the card touch surface equivalent in function to the edges 22 in the front panel 12 of FIG. 1, to assist in correctly aligning the magnetic cards in relation to the sensor array 36.

A relatively low cost yet highly tamper proof magnetic reader may be constructed by encapsulating the sensor circuit board 38 together with the logic and communication circuits, if any, in a single unitary solid block of magnetically permeable material which need not have any moving parts and does not have a card slot opening.

It must be understood that many alterations and modifications may be made by those having ordinary skill in the art to the present invention without departing from the spirit and scope of the invention. Therefore, the presently illustrated embodiment has been shown only by way of example and for the purpose of clarity and should not be taken to limit the scope of the following claims.

I claim:

1. A slotless card reader for reading a magnetically encoded card, said card reader comprising:
   a slotless front panel having an inner side and a public side;
   magnetic card reader means disposed on said inner side of said panel;
   at least a portion of said front panel being of a magnetically permeable material defining a card touch area on said public side over said card reader means, said card touch area being exposed on said public side for manually applying magnetic card downwardly thereagainst and for lifting such a card therefrom; and
   positioning means on said public side for aligning a magnetic card manually held flat against said card touch area with said card reader means.

2. The device of claim 1 wherein said magnetic reader means including an array of magnetic sensors disposed on one side of said card touch area.

3. The device of claim 1 wherein said card touch area is substantially flat and has at least one edge, and said front panel is recessed from said card touch area along at least a portion of one side of said card touch area to thereby facilitate manual application of a card to said card touch area.

4. The device of claim 3, wherein said card touch area is rectangular.

5. The device of claim 3 wherein said front panel has raised portions about said card touch area for precisely positioning a card on said card touch area relative to said card reader means.

6. The device of claim 3 wherein said card touch area is substantially flat.

7. The device of claim 1 wherein said magnetically permeable material is a sheet of stainless steel.

8. The card reader of claim 1 wherein said card reader means comprises:
   first sensor means responsive to a card correctly positioned for reading on said front panel;
   second sensor means responsive to actuation of said first sensor means for reading a first code on a correctly positioned card including logic means for identifying said first code as a valid code; and
   third sensor means responsive to validation of said first code for reading a second code on the card.

9. A slotless card reader for reading a magnetically encoded card comprising:
   an array of magnetic sensors defining a card plane;
   magnetically permeable means covering said array and defining a card touch surface overlying said card plane said card touch surface being exposed for manually applying a magnetic card downwardly thereagainst and for lifting a card therefrom; and
   positioning means for accurately aligning a magnetic card manually held against said card touch surface in relation to said array of magnetic sensors.

10. The slotless card reader of claim 9 further comprising a plurality of position sensors positioned such that simultaneous actuation of said plurality by a magnetic card is indicative of correct positioning of said card for reading.

11. The slotless card reader of claim 10 wherein the magnetic sensors in said array draw current in a stand-by state and further comprising switch means responsive to simultaneous actuation of said position sensors for applying power to the remaining sensors in said array, said remaining sensors being normally switches off to conserve power.

12. The slotless card reader of claim 10 wherein said magnetic sensors are Hall effect devices.

13. The slotless card reader of claim 11 wherein said magnetic sensors are Hall effect devices.

14. The slotless card reader of claim 9 wherein said array of magnetic sensors is encapsulated in a magnetically permeable material, said encapsulating material being shaped to define both said card touch surface and said positioning means.

15. A slotless card reader for reading a magnetically encoded card comprising an array of magnetic sensors encapsulated in a magnetically permeable material, said encapsulating material being shaped to define a slotless front panel surface including a card touch surface overlying said array, said card touch surface being exposed for manually applying a magnetic card downwardly thereagainst and for lifting a card therefrom, and positioning means for accurately aligning a magnetic card on said card touch surface in relation to said array for reading by said magnetic sensors.

16. The slotless card reader of claim 15 wherein said encapsulating material is shaped to also define said positioning means.

17. A slotless card reader for reading a magnetically encoded card comprising:
   an array of magnetic sensors defining a card plane;
   magnetically permeable means covering said array and defining a card touch surface overlying said card plane;
   positioning means for accurately aligning a magnetic card on said card touch surface in relation to said array of magnetic sensors; and
   a plurality of position sensors positioned such that simultaneous actuation of said plurality by a magnetic card is indicative of correct positioning of said card for reading.

18. The slotless card reader of claim 17 wherein the magnetic sensors in said array draw current in a stand-by state and further comprise switch means responsive to simultaneous actuation of said position sensors for applying power to the remaining sensors in said array, said remaining sensors being normally switched off to conserve power.

19. The slotless card reader of claim 17 wherein said magnetic sensors are Hall effect devices.

20. The slotless card reader of claim 19 wherein said magnetic sensors are Hall effect devices.

21. A slotless card reader for reading a magnetically encoded card comprising:
   an array of magnetic sensors defining a card plane;
   magnetically permeable means covering said array and defining a card touch surface overlying said card plane; and
   positioning means for accurately aligning a magnetic card on said card touch surface in relation to said array of magnetic sensors;
   said sensor array including a plurality of position sensors positioned such that simultaneous actuation of said plurality by a magnetic card is indicative of correct positioning of said card for reading.

22. The slotless card reader of claim 21 wherein the magnetic sensors in said array draw current in a stand-by state and further comprising switch means responsive to simultaneous actuation of said position sensors for applying power to the remaining sensors in said array, said remaining sensors being normally switched off to conserve power.

23. The slotless card reader of claim 21 wherein said magnetic sensors are Hall effect devices.

24. The slotless card reader of claim 23 wherein said magnetic sensors are Hall effect devices.

* * * * *